US010226035B2

(12) United States Patent
Canfield et al.

(10) Patent No.: US 10,226,035 B2
(45) Date of Patent: *Mar. 12, 2019

(54) RADIATING SYSTEMS FOR AFFECTING INSECT BEHAVIOR

(71) Applicant: Technology SG, L.P., West Conshocken, PA (US)

(72) Inventors: Eric L. Canfield, Exton, PA (US); Thomas M. Dykstra, Alachua, FL (US); Scott J. Soma, Media, PA (US); Robert E. Rasmussen, Coatesville, PA (US); Robert P. Alston, Exton, PA (US)

(73) Assignee: Technology SG, L.P., West Conshohocken, PA (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/930,421

(22) Filed: Nov. 2, 2015

(65) Prior Publication Data

US 2016/0050900 A1 Feb. 25, 2016

Related U.S. Application Data

(60) Continuation of application No. 14/665,906, filed on Mar. 23, 2015, now Pat. No. 9,173,388, which is a
(Continued)

(51) Int. Cl.
*A01M 1/04* (2006.01)
*A01M 1/02* (2006.01)
(Continued)

(52) U.S. Cl.
CPC .............. *A01M 1/02* (2013.01); *A01M 1/04* (2013.01); *A01M 1/10* (2013.01); *A01M 1/145* (2013.01);
(Continued)

(58) Field of Classification Search
CPC ............ A01M 1/00; A01M 1/02; A01M 1/04; A01M 1/08; A01M 1/10; A01M 1/14;
(Continued)

(56) References Cited

U.S. PATENT DOCUMENTS 1,819,551 A * 8/1931 Gourdon ................ A01M 1/08
43/113
2,059,835 A * 11/1936 Worthing .............. A01M 1/226
43/132.1
(Continued)

FOREIGN PATENT DOCUMENTS

WO WO 98/10643 A1 3/1998
WO WO 9810643 A1 * 3/1998 .............. A01M 1/04
(Continued)

OTHER PUBLICATIONS

Callahan, P.S., "A High Frquencey Dielectric Waveguide on the Antennae of Night-Flying Moths (*Saturnidae*)," Applied Optics, vol. 7, No. 8, Aug. 1968; pp. 1425-1430.
(Continued)

*Primary Examiner* — Darren W Ark
(74) *Attorney, Agent, or Firm* — Sterne, Kessler, Goldstein & Fox P.L.L.C.

(57) ABSTRACT

An insect decoy is provided that includes a vapor-isolated vessel, a chemical compound disposed within the vapor-isolated vessel, and an excitation energy source. The chemical compound may have one or more absorption bands at a set of absorption wavelengths and have one or more emission bands at a set of emission wavelengths. The excitation energy source may be configured to produce electromagnetic radiation at the absorption wavelengths so as to fluoresce the chemical compound and release photons at the emission wavelengths. The vapor-isolated vessel may be configured with at least one infrared transmissive window that is substantially transparent to the released photons at the emission wavelengths of the chemical compound.

21 Claims, 4 Drawing Sheets

Related U.S. Application Data division of application No. 13/839,636, filed on Mar. 15, 2013, now Pat. No. 8,984,800.

(51) Int. Cl.
| | |
|---|---|
| *A01M 29/10* | (2011.01) |
| *A01M 29/08* | (2011.01) |
| *A01M 31/06* | (2006.01) |
| *A01M 1/10* | (2006.01) |
| *A01M 29/06* | (2011.01) |
| *A01M 29/28* | (2011.01) |
| *A01M 1/14* | (2006.01) |
| *A01M 1/22* | (2006.01) |

(52) U.S. Cl.
CPC ............ *A01M 1/223* (2013.01); *A01M 29/06* (2013.01); *A01M 29/08* (2013.01); *A01M 29/28* (2013.01); *A01M 31/06* (2013.01)

(58) Field of Classification Search
CPC ...... A01M 1/226; A01M 29/00; A01M 29/06; A01M 29/08; A01M 29/10; A01M 29/24; A01M 29/28
USPC ............. 43/107, 113, 114, 132.1; 250/493.1, 250/494.1, 495.1, 503.1, 504 R, 505.1, 250/517.1
See application file for complete search history.

(56) References Cited

U.S. PATENT DOCUMENTS

| | | | | |
|---|---|---|---|---|
| 2,645,877 A * | 7/1953 | Pohlman | A01M 1/04 | 43/113 |
| 2,731,762 A * | 1/1956 | Jones | A01M 1/04 | 43/113 |
| 3,653,145 A * | 4/1972 | Stout | A01M 1/04 | 43/131 |
| 3,997,785 A * | 12/1976 | Callahan | H01S 3/00 | 250/338.1 |
| 4,018,530 A * | 4/1977 | Hirschfeld | G01N 21/6408 | 250/459.1 |
| 4,069,615 A * | 1/1978 | Gilbert | E06B 9/52 | 43/107 |
| 4,127,961 A * | 12/1978 | Phillips | A01M 1/145 | 43/113 |
| 4,282,673 A * | 8/1981 | Focks | A01M 1/08 | 43/113 |
| 4,411,093 A * | 10/1983 | Stout | A01M 1/20 | 43/114 |
| 4,490,040 A * | 12/1984 | Lucht | G01N 21/645 | 250/458.1 |
| 4,675,300 A * | 6/1987 | Zare | G01N 27/44721 | 204/452 |
| 4,982,100 A * | 1/1991 | Harding, Jr. | A01M 29/08 | 250/493.1 |
| 5,247,933 A * | 9/1993 | Callahan | A61B 5/00 | 600/310 |
| 5,424,551 A * | 6/1995 | Callahan | A01M 1/02 | 43/113 |
| 5,528,049 A * | 6/1996 | Callahan | A01M 1/02 | 43/113 |
| 5,634,292 A * | 6/1997 | Kitterman | A01M 1/02 | 43/113 |
| 5,766,617 A * | 6/1998 | Heath | A01M 1/02 | 424/407 |
| 5,801,828 A * | 9/1998 | Collins | G01N 21/645 | 250/461.1 |
| 5,896,695 A * | 4/1999 | Walker | A01M 1/145 | 43/113 |
| 5,921,018 A * | 7/1999 | Hirose | A01M 1/026 | 43/132.1 |
| 6,088,949 A | 7/2000 | Nicosia et al. | | |
| 6,178,687 B1 * | 1/2001 | Frisch | A01M 1/14 | 43/114 |
| 6,199,315 B1 * | 3/2001 | Suzue | A01M 1/04 | 43/113 |
| 6,298,011 B1 * | 10/2001 | Nyberg | A01M 1/226 | 367/139 |
| 6,301,194 B1 * | 10/2001 | Cauchy | A01M 29/18 | 367/139 |
| 6,438,894 B1 * | 8/2002 | Silvandersson | A01M 1/14 | 43/114 |
| 6,515,539 B1 * | 2/2003 | Levanon | H01S 1/02 | 330/4 |
| 6,655,080 B2 | 12/2003 | Spiro et al. | | |
| 6,662,489 B2 | 12/2003 | Spiro et al. | | |
| 6,795,568 B1 * | 9/2004 | Christensen | A01M 21/04 | 250/559.29 |
| 6,928,769 B2 * | 8/2005 | Crawley | A01M 1/226 | 43/107 |
| 6,965,205 B2 * | 11/2005 | Piepgras | H05B 33/0863 | 315/292 |
| 7,176,828 B2 * | 2/2007 | Tirkel | G01V 8/005 | 342/114 |
| 7,181,885 B2 | 2/2007 | Spiro et al. | | |
| 7,286,056 B2 * | 10/2007 | Kates | A01M 31/002 | 250/221 |
| 7,368,743 B2 * | 5/2008 | Nichols | G01N 21/8422 | 250/504 R |
| 7,412,797 B1 | 8/2008 | Hiscox | | |
| 7,415,313 B2 * | 8/2008 | Brueckner | B25J 9/1617 | 422/105 |
| 7,541,936 B2 * | 6/2009 | Wijenberg | A01M 1/02 | 43/113 |
| 7,599,731 B2 * | 10/2009 | Rice | A61B 5/0073 | 250/363.01 |
| 7,623,625 B2 * | 11/2009 | Boyden | G01N 23/201 | 378/86 |
| 7,698,853 B2 * | 4/2010 | Ragon | A01M 1/02 | 43/132.1 |
| 7,712,247 B2 * | 5/2010 | Wijenberg | A01M 1/02 | 43/121 |
| 7,784,215 B2 * | 8/2010 | Cohnstaedt | A01M 1/04 | 43/113 |
| 7,869,042 B2 * | 1/2011 | Aasmul | G01J 1/04 | 356/417 |
| 7,892,528 B2 * | 2/2011 | Siljander | A01M 1/026 | 424/84 |
| 7,937,887 B2 * | 5/2011 | Child | A01M 1/023 | 43/113 |
| 8,111,164 B2 * | 2/2012 | Bryce | A01M 29/24 | 340/573.2 |
| 8,211,419 B2 * | 7/2012 | Siljander | A01M 1/026 | 424/84 |
| 8,893,428 B2 * | 11/2014 | Dykstra | A01M 1/02 | 43/132.1 |
| 8,984,800 B2 * | 3/2015 | Canfield | A01M 1/04 | 43/132.1 |
| 9,173,388 B2 * | 11/2015 | Canfield | A01M 1/04 | |
| 9,258,992 B2 * | 2/2016 | Shefer | E02D 29/14 | |
| 9,462,798 B2 * | 10/2016 | Ribiere-Tharaud | A01M 1/02 | |
| 9,538,740 B2 * | 1/2017 | Haik | A01M 1/103 | |
| 9,775,334 B2 * | 10/2017 | Dykstra | A01M 1/02 | |
| 2002/0125419 A1 * | 9/2002 | Callahan | H01S 1/00 | 250/251 |
| 2003/0151006 A1 | 8/2003 | Dykstra | | |
| 2003/0178616 A1 * | 9/2003 | Prevenslik | H01S 3/09 | 257/14 |
| 2004/0115235 A1 * | 6/2004 | Simpson | A01M 1/02 | 424/416 |
| 2005/0212691 A1 | 9/2005 | Tickel et al. | | |
| 2007/0107297 A1 | 5/2007 | Wijenberg et al. | | |
| 2007/0132598 A1 | 6/2007 | Wijenberg et al. | | |
| 2008/0168703 A1 | 7/2008 | Siljander et al. | | |
| 2008/0289246 A1 * | 11/2008 | van Bers | A01M 1/14 | 43/113 |
| 2009/0086894 A1 * | 4/2009 | Boyden | A61B 6/00 | 250/309 |

(56) References Cited

U.S. PATENT DOCUMENTS

| | | | | |
|---|---|---|---|---|
| 2009/0288333 | A1* | 11/2009 | Johnston | A01M 1/02 43/113 |
| 2010/0050499 | A1 | 3/2010 | Liang | |
| 2010/0071257 | A1* | 3/2010 | Tsai | A01M 29/10 43/113 |
| 2011/0099886 | A1 | 5/2011 | Siljander et al. | |
| 2011/0101252 | A1* | 5/2011 | Rubochkin | A01M 29/10 250/504 R |
| 2011/0136154 | A1* | 6/2011 | Geddes | G01N 33/54373 250/216 |
| 2011/0296740 | A1* | 12/2011 | Yamada | A01M 1/04 43/113 |
| 2012/0032096 | A1* | 2/2012 | Marka | A01M 29/10 250/492.1 |
| 2012/0061590 | A1* | 3/2012 | Khojasteh | A61B 1/0638 250/459.1 |
| 2012/0204475 | A1 | 8/2012 | Schneidmiller et al. | |
| 2012/0315666 | A1* | 12/2012 | Fujioka | G01N 15/0612 250/459.1 |
| 2013/0283671 | A1* | 10/2013 | Czokajlo | A01M 23/005 43/113 |
| 2014/0197335 | A1* | 7/2014 | Jayasooriya | G01N 21/65 250/459.1 |
| 2015/0150233 | A1* | 6/2015 | Dykstra | A01M 1/02 43/113 |
| 2015/0196019 | A1 | 7/2015 | Canfield et al. | |
| 2015/0237844 | A1* | 8/2015 | Ribiere-Tharaud | A01M 1/02 43/107 |

FOREIGN PATENT DOCUMENTS

| | | | | |
|---|---|---|---|---|
| WO | WO 2008088546 | A2 * | 7/2008 | A01M 1/026 |
| WO | WO 2012010238 | A1 * | 1/2012 | A61N 5/0616 |

OTHER PUBLICATIONS

Callahan, P.S., "Comments on Mark Diesendorf's Critique of My Review Paper," International Journal of Insect Morphology and Embryology, vol. 6, No. 2, 1977; pp. 111-122.

Callahan, P.S., "Insect Antennae wih Special Reference to the Mechanism of Scent Detection and the Evolution of the Sensilla," International Journal of Insect Morphology & Embryology, vol. 4, No. 5, 1975; pp. 381-430.

Callahan, P.S., "Insect Molecular Bioelectronics: A Theoretical and Experimental Study of Insect Sensillae as Tubular Waveguides, with Particular Emphasis on Their Dielectric and Thermoelectret Properties," Miscellaneous Publications of the Entomological Society of America, vol. 5, No. 7, 1967; pp. 315-347.

Callahan, P.S., "Intermediate and Far Infrared Sensing of Nocturnal Insects. Part I. Evidences for Far Infrared (FIR) Electromagnetic Theory of Communication and Sensing in Moths and Its Relationship to the Limiting Biosphere of the Corn Earworm," Annals of the Entomological Society of America, vol. 58, No. 5, Sep. 1965; pp. 727-745.

Callahan, P.S.., "Moth and candle: the candle flame as a sexual mimic of the coded infrared wavelengths from a moth sex scent (pheromone)," Applied Optics, vol. 16, No. 12, Dec. 1977; pp. 3089-3097.

Callahan, P.S., et al., "The Scape and Pedicel Dome Sensors—A Dielectric Aerial Waveguide on the Antennae of Night-Flying Moths," Annals of the Entomological Society of America, vol. 61, No. 4, Jul. 1968; pp. 934-937.

Diesendorf, M., et al., "A theoretical investigational of radiation mechanisms of insect chemoreception," Proceedings of the Royal Society of London, Series B, Vool. 185, 1974; pp. 33-49.

Diesendorf, M., "Insect Sensilla as Dielectric Aerials for Scent Detection: Comments on a Review by Callahan," CSIRO, Division of Mathematics and Statistics, International Journal of Insect Morphology & Embryology, vol. 6, No. 2, 1977; 12 pages.

Diesendorf, M., "The 'Dielectric Waveguide Theory' of Insect Olfaction: A Reply to P.S. Callahan," International Journal of Insect Morphology and Embryology, vol. 6, No. 2, 1977; pp. 123-126.

Fabre, J.-H., "Social Life in the Insect World," 1st Edition published 1911, e-Book released May 8, 2006; 136 pages.

Laithwaite, E.R., "A Radiation Theory of the Assembling of Moths," The Entomologist, vol. 93, No. 1165, Jun. 1960; pp. 1-5.

Lakowicz, J.R., "Principles of Fluorescence Spectroscopy," 3rd Edition, 2006; pp. 32 and 74-75.

Millar, J.G., et al., "Evaluation of Release Rates of Codling Moth Pheromone Mating Disruption Dispensers," 1995; pp. 167-170.

Prevenslik, T., "Odorant molecules signal the G-protein receptors with their unique IR spectra," PRLog, Sep. 26, 2010; 3 pages.

Prevenslik, T., "Olfaction and Far Infrared Signalling by Moth," QED Radiations Discovery Bay, 2011; 3 pages.

Smith, F.G., "The Infrared and Electro-Optical Systems Handbook, vol. 2: Atmospheric Propagation of Radiation," The Society of Photo-Optical Instrumentation Engineers, 1993; 333 pages.

Sower, L.L., et al., "Rate of Release of the Sex Pheromone of the Female Indian Meal Moth," Environmental Entomology, vol. 4, No. 1, Feb. 1975; pp. 168-169.

Suh, C., et al., "Profile of Pheromone Released from Hercon, Plato, and Scentry Lures," TAC Meeting, USDA Agricultural Research Service Feb. 14-15, 2011; 14 pages.

Traill, R.R., "How Popperian positivism killed a good-but-poorly-presented theory—Insect Communication by Infrared," Ondwelle Short-Monograph, No. 3, 2005; pp. 1-24.

Zissis, G.J., "The Infrared and Electro-Optical Systems Handbook, vol. 1: Sources of Radiation," The Society of Photo-Optical Instrumentation Engineers, 1993; 383 pages.

International Search Report and Written Opinion directed to related International Patent Application No. PCT/US14/23480, dated Jul. 8, 2014; 16 pages.

Callahan, P.S., "Tuning in to Nature: Infrared Radiation and the Insect Communication System," 25th Anniversary Edition, Acres U.S.A., Publishers (2001).

* cited by examiner

RADIATING SYSTEMS FOR AFFECTING INSECT BEHAVIOR

FIELD

Embodiments of the present invention are directed to electromagnetic radiation systems for affecting insect behavior.

BACKGROUND

Integrated Pest Management, or IPM, for the US Department of Agriculture's estimated 913 million farmed acres, the more than 7 billion bushels of stored grain, and the 100 million metric tons of exported agricultural products is a multi-billion dollar industry in the United States. The worldwide problem of pest management is much larger.

Stored grain is transported all over the world by ship, truck, and plane. The distribution of grain is dependent on short to long-term storage ranging from a few days to more than a year. The long-term storage of grain has encouraged the exponential growth of many insects and other pests that infest stored grain. One example pest is the Indian meal moth. Augmentation of pest populations are facilitated by the virtually unlimited food source found in storage grain bins or warehouses. Estimated losses caused by pests in temperate climates come to approximately 10-15%, but in tropical countries, the figure can be as high as 60%.

In less severe cases, unhealthy insect infestations, while not directly consuming the grain in bulk, greatly reduce marketability simply by their presence. Insect body parts or residues that can be found in storage grain samples thus create financial hardship for many farmers. On a state level, this monetary figure runs into the hundreds of millions of dollars, but nationally, it is in the billions.

Farmers and industry have turned to chemical management in the form of pesticides and insecticides in an effort to reduce the pest populations found in stored grains and invading farmland. Several problems are associated with the chemical management of pest infested stored grains and the spraying of insecticides over millions of acres of crops. These problems include chemical residues being left on grain destined for human or animal consumption, accidental human exposure to fumigants resulting in death or sickness, corrosive damage to sensitive equipment such as computers, and the potentially high financial costs of fumigation, most especially at ports. These are serious problems that all present and future fumigation companies must address. Further, the ongoing research and development of even more potent and potentially toxic pesticides continues because insects are robust in their ability to develop immunity over time to those chemicals designed specifically to control their populations. Simply stated, the chemicals that work to reduce insect populations today will likely be ineffective in the future due to the insects developing resistance to the same.

An alternative to chemical management is the use of insect traps that contain artificially produced molecules called pheromones. These artificial pheromones may also be deployed in agriculture in order to confuse the insects or disrupt mating. Typically in nature, these molecules are released into the atmosphere by the insects and are used to locate a mate or to aggregate. Current pheromone traps have many limitations. One limitation includes the relatively small number of insects trapped over a given period of time relative to the actual insect population. There are no reliable figures to specify the percentage of insects that can be successively trapped in a given area. Therefore, the traps are more frequently used to simply determine the presence of a given insect population so that some other method of population control can be deployed, which is usually insecticidal in nature. As a result, years of research wholly supports that the traps are ineffective at significantly reducing insect populations in a storage grain bin or warehouse unless the traps are used in very high densities. With respect to aerosol or lure deployment for agricultural control of insects on farmland, it is an expensive proposition with numerous limitations. Inclement weather, high winds, and other factors all contribute to this type of deployment often not even being considered as a solution.

A second limitation is the reduced longevity of the pheromone source or lure in conventional traps, aerosols, or lures. The longevity of the typical pheromone lure is estimated to be approximately six weeks, based on written information provided by the pheromone manufacturers.

BRIEF SUMMARY

Consequently, a system is provided herein to solve the above-identified problems without the harmful side-effects of chemical management.

In an embodiment of the present invention, an insect decoy is provided that includes a vapor-isolated vessel, a chemical compound disposed within the vapor-isolated vessel, and a naturally occurring or artificially produced excitation energy source. The chemical compound may have one or more absorption bands at a set of absorption wavelengths and have one or more emission bands at a set of emission wavelengths. The excitation energy source may be configured to produce electromagnetic radiation at the absorption wavelengths so as to fluoresce the chemical compound and release photons at the emission wavelengths. The vapor-isolated vessel may be configured with at least one infrared transmissive window that is substantially transparent to the released photons at the emission wavelengths of the chemical compound.

In another embodiment of the present invention, an insect trap is provided that includes an outer vessel and a closed, vapor-isolated inner vessel within the outer vessel. The outer vessel may include a housing and at least one infrared transmissive window. The housing may include an opening configured to allow one or more insects to enter the outer vessel while preventing the one or more insects from exiting the outer vessel. The closed, vapor-isolated inner vessel may include at least one infrared transmissive window aligned with the infrared transmissive window in the outer vessel and a chemical compound disposed within the vapor-isolated inner vessel. The chemical compound may have one or more absorption bands at a set of absorption wavelengths and have one or more emission bands at a set of emission wavelengths. The infrared transmissive window is substantially transparent to electromagnetic radiation at the absorption wavelengths and electromagnetic radiation at the emission wavelengths of the chemical compound. The chemical compound releases photons at the emission wavelengths when electromagnetic radiation at the absorption wavelengths is received by the chemical compound.

Further features and advantages, as well as the structure and operation, of various embodiments of the present invention are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

The features and advantages of the present invention will become more apparent from the detailed description set forth below when taken in conjunction with the drawings.

DETAILED DESCRIPTION

Embodiments of the present invention provide a radiating insect decoy system for inducing behavioral changes in various types of insects. Inducing behavioral changes may be in the form of producing attractive, repulsive, or chaotic movement responses in various insects with respect to the embodiments of the present invention.

Figure 1B:
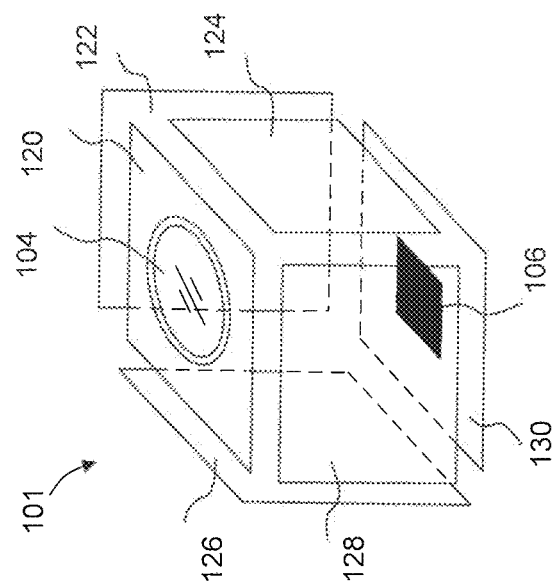
FIG. 1B illustrates an exploded view of the insect decoy system of FIG. 1.
Figure 1A:
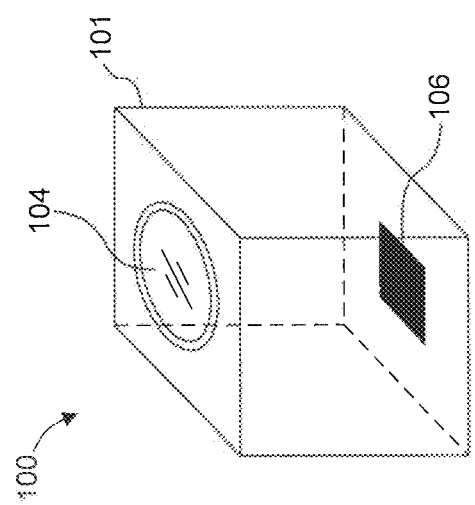
FIG. 1A illustrates an insect decoy system according to an embodiment of the present invention.
Figure 3:
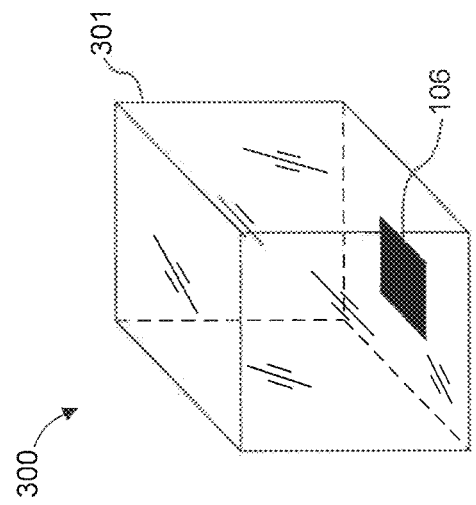
FIG. 3 illustrates an insect decoy system according to another embodiment of the present invention.
Figure 2:
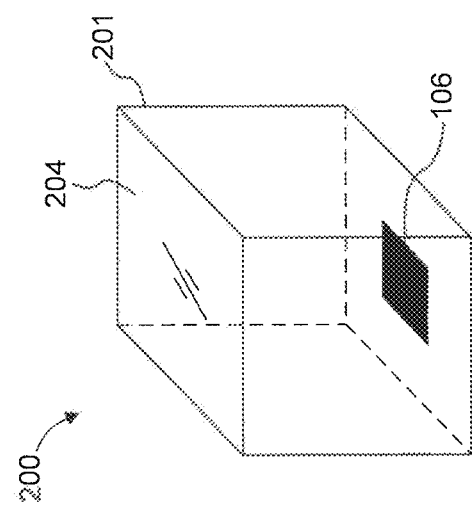
FIG. 2 illustrates an insect decoy system according to another embodiment of the present invention.
Figure 5:
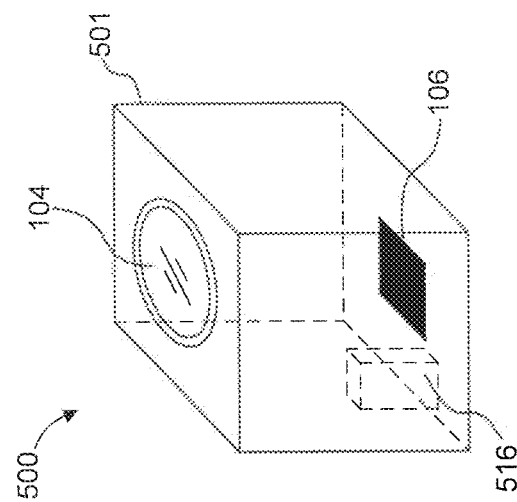
FIG. 5 illustrates an insect decoy system including an internal excitation energy source according to an embodiment of the present invention.
Figure 4:
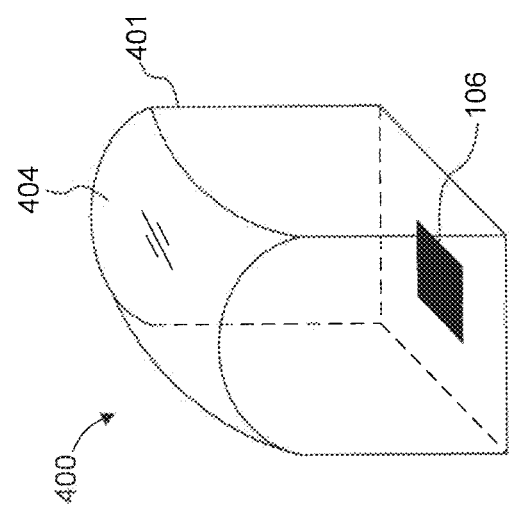
FIG. 4 illustrates an insect decoy system according to another embodiment of the present invention.

FIG. 1A illustrates an insect decoy system 100 according to an embodiment of the present invention. System 100 includes a vapor-isolated vessel 101. Vapor-isolated vessel 101 may include a window 104, and a chemical compound 106. Vessel 101 may include sides 120, 122, 124, 126, 128, and 130, as illustrated in FIG. 1B in an exploded view of system 100. Vapor-isolation may be provided, for example, by hermetically sealing vessel 101 or by placing vessel 101 under vacuum. As used herein, the term "vapor-isolated" does not require 100% vapor isolation. A vapor-isolated vessel may be substantially vapor-isolated, such as 90-95% vapor-isolated if, for example, sides 120, 122, 124, 126, 128, or 130 exhibit some degree of vapor porosity. 100% vapor isolation is referred to herein as "completely vapor-isolated." Vessel 101 may be configured to be weather resistant and capable of being mounted or portably deployed in agricultural and stored grain environments.

In one example of this embodiment, chemical compound 106 emits infrared electromagnetic radiation by means of fluorescence. Fluorescence occurs when energy (e.g., light) from an excitation energy source is absorbed by a body (or molecule) at one or more frequency range(s) and is re-emitted at one or more different frequency ranges. The photonic emission is generally of a longer wavelength than the excitation source.

An absorption spectrum of a body is a plot of the absorption intensity of the fraction of incident radiation absorbed by that body as a function of wavelengths covering the electronic energy levels of the molecules in the body. While absorption spectra can be recorded for any absorbing material, excitation spectra can be recorded only for fluorescent materials apart from their usual absorption spectra.

For fluorescent materials, there are two types of spectra, namely, fluorescence emission spectra and excitation spectra. Emission spectra can be recorded by fixing an excitation wavelength at a particular wavelength, while intensity of emission wavelengths is scanned. The recorded emission wavelengths are obtained due to radiative relaxations of molecules from a higher energy level to which molecules are excited with energy at the fixed excitation wavelength to various lower energy levels. In an opposite manner, excitation spectra can be recorded by scanning intensity of excitation wavelengths while an emission wavelength is kept constant. In other words, an excitation spectrum will provide all the wavelengths absorbed by molecule that will result in a particular emission wavelength. All the excitation spectra corresponding to all the emission wavelengths can provide a spectrum which is almost the same as the absorption spectrum, but which differs somewhat since a signature of absorption is not obtained if that absorption does not yield fluorescence emission.

Chemical compound 106 may be characterized as having one or more absorption bands at different absorption wavelengths and one or more emission bands at different emission wavelengths.

As will be discussed in further detail below, the behavior of different types of insects may be affected by different emission wavelengths. These different wavelengths may include different fluorescence wavelengths of the same chemical compound, or the different wavelengths may include fluorescence wavelengths of multiple chemical compounds. Therefore, one chemical compound 106 may be used as an attractant, repellent, or disruptive agent for different types of insects. One or more chemical compounds 106 with different absorption and emission bands may be used in decoy system 100 to target different types of insects.

Chemical compound 106, in an example embodiment, may include pheromone molecules. The fluorescence characteristics of the pheromone molecules results in the emission of electromagnetic radiation at various wavelengths in the infrared spectrum, referred to herein as the emission wavelengths. These wavelengths may be detected by insects and cause a change in their behavior. If an insect is sensitive to the emission wavelengths, such as those insects targeted by a specific pheromone, there are several types of behavior that may result from the insect's exposure to the emission wavelengths. A first type of behavior is an attraction behavior. If the emission wavelengths correspond to those produced by a sex or aggregation pheromone, an insect that detects the emission wavelengths may be attracted or lured to the pheromone as if it were a mating signal or a call to aggregate, respectively. A second type of behavior is a repelling behavior. If the emission wavelengths are too strong or are representative of something the insect would perceive as a threat, an insect may be overwhelmed and repelled by the signal, or seek evasive action or cover in the event of a perceived threat. A third type of behavior is confusion or chaotic response, which results when the emission wavelengths disrupt the insect from its normal behavior. Tests have shown that when some insects are exposed to certain emission wavelengths, their behavior is disrupted. The insects may, for example, become abnormally active, using up their own energy resources such that they are unable to properly mate, or such that they die sooner than expected. The depletion of their energy resources may also produce unhealthy offspring, eventually resulting in an overall reduction in the insect population.

The infrared fluorescence of the pheromone molecules allows the use of pheromone molecules even though they are housed in vapor-isolated vessel 101. In fact, the vapor-isolation of the pheromone molecules in vessel 101 may enable greater longevity of the molecules than the current methods used for deployment, including traps and aerosols, which diffuse pheromone molecules into open space. Dissipation, spreading, diffusion, or releasing of pheromone molecules into the open environment can cause a decline in parts-per-million concentration and radiation release rates as a function of time, such that their effectiveness in prompting insect behavior is also reduced.

In an example embodiment, chemical compound 106 is deposited on or adhered to a single one of sides 120, 122, 124, 126, 128, and 130. In another example embodiment, chemical compound 106 is deposited onto a plurality of interior sides of vessel 101. Each side of vessel 101 may have deposited the same or a different chemical compound. As mentioned above, different types of chemical compounds may be used to enable decoy system 100 to affect behavior in a variety of insects. In another example of this embodiment, chemical compound 106 may be deposited or adhered onto one or more substrates placed in vessel 101, instead of being deposited directly onto a side of vessel 101. Other mechanisms, methodologies, and techniques can be employed to introduce chemical compound 106 into vessel 101, and are deemed to be within the scope of the present invention.

The chemical compound may be in liquid, gaseous, or solid form. For example, the chemical compound may be a gas or liquid that fills a separate vial located within vessel 101, said vial being transmissive to the absorption and emission wavelengths of interest specific to the chemical compound. In another example, the gas may be inserted directly into vessel 101, such that it disperses throughout vessel 101. In another example, the chemical compound is a liquid or solid disposed on an interior surface of vessel 101 or a surface of a separate substrate, which substrate is then placed within vessel 101. Any other number of mechanisms may be employed to contain the chemical compound in insect decoy system 100.

FIGS. 1A and 1B show vessel 101 as a cuboid shape having sides 120, 122, 124, 126, 128, and 130, according to an example embodiment. However, vessel 101 is not restricted to being cuboid in shape or having other straight-sided shapes. Vessel 101 may be configured to be any type of geometric shape, such as but not limited to cylindrical, spherical, or elliptical. Vessel 101 may be constructed from a variety of materials that are configured to prevent substantial penetration of vapor or electromagnetic radiation from chemical compound 106 through sides 120, 122, 124, 126, 128, and 130. Alternatively, one or more sides may be made of a material that prevents substantial penetration of vapor, but which is transmissive to electromagnetic radiation at the absorption and/or emission wavelengths. Vessel 101 materials may include natural or synthetic materials, such as but not limited to metals, non-metals, and/or alloys. For example, vessel 101 may be made from, for example and without limitation, high density polyethylene (HDPE) or low-density polyethylene (LDPE). Such materials may have transmissivity through 20 microns, for example, to allow passage of infrared radiation while restricting other types of electromagnetic radiation.

In one example of this embodiment, the inner surface of one or more sides of vessel 101 may be partially or fully covered with a reflective surface. In an embodiment, chemical compound 106 may be deposited on or adhered to one or more sides having reflective surfaces. A reflective surface may include a mirror or like material that prevents, for example, absorption of radiation from chemical compound 106 or passing of radiation from chemical compound 106 through vessel 101. The surface may be, for example, a first surface mirror. The reflective surface may be reflective to electromagnetic radiation at wavelengths of the absorption band, emission band, or both the absorption and emission bands of chemical compound 106, according to examples of this embodiment.

Window 104 may be transmissive to infrared radiation according to an example embodiment. Window 104 may be transmissive specifically to wavelengths in the emission bands of chemical compound 106. Window 104 may also be transmissive to wavelengths in the absorption bands of chemical compound 106. Infrared transmissive window 104 may be slightly porous, thereby making vessel 101 less than 100% vapor-isolated. For example, infrared transmissive window 104 may be made from a material that is approximately 5% porous (95% vapor-isolated). HDPE is one such material.

As illustrated in FIG. 1A, window 104 may be strategically positioned to allow emission of electromagnetic radiation from chemical compound 106 through window 104. Although window 104 is illustrated as being located on top of vessel 101, window 104 may additionally or alternatively be located at other sides of vessel 101, as long as emission of radiation from chemical compound 106 can be released into the environment external to vessel 101.

FIGS. 1A and 1B illustrate vessel 101 having a window 104 of a circular shape. However, vessel 101 may include windows in various shapes and sizes. As shown in FIG. 2, vessel 201 of insect decoy system 200 may include a rectangular shaped window 204 that forms a side of vessel 201, according to an embodiment of the present invention. Window 204 may have similar transmissive properties as window 104. Yet in another embodiment, vessel 201 may include a plurality of windows with transmissive properties similar to windows 104 and 204. The plurality of windows may form a vessel 301, as illustrated in FIG. 3. Even though FIG. 3 illustrates insect decoy system 300 as a vessel 301 having a substantially flat, straight-sided window on each side, a window of vessel 301 may take any geometric shape, such as but not limited to cylindrical, spherical, or elliptical.

In embodiments, window 104 may be directional or omnidirectional. As further illustrated in FIG. 4, according to an embodiment, vessel 401 of insect decoy system 400 may include a lens, such as a concave lens, as window 404. Window 404 may be capable of focusing infrared radiation emitted by chemical compound 106. In an embodiment, directionality may be additionally or alternatively facilitated with an internal or external reflector (not shown).

According to another embodiment of the present invention, FIG. 5 illustrates an insect decoy system 500. Insect decoy system 500 is similar to insect decoy system 100 of FIG. 1, but includes an excitation energy source 516 within vapor-isolated vessel 501. Excitation energy source 516 may be an isolated system located within vessel 501, or it may be an integrated part of vessel 501. Examples of excitation energy source elements include, without limitation, heating elements, capacitive elements, and solar energy elements. If the excitation energy source is an integrated part of vessel 501, then excitation energy source 516 is a part of vessel 501. In an embodiment, excitation energy source 516 is integrated into one or more sides of vessel 501. For example, a side of vessel 501 may be made of a dielectric material that builds up energy as a capacitive charge. This energy can then be transferred to chemical compound 106.

Excitation energy source 516 may be configured to produce electromagnetic radiation in the absorption bands of chemical compound 106. Exciting chemical compound 106 with radiation produced by excitation energy source 516 may result in the fluorescence of compound 106. This fluorescence releases photons having wavelengths in the emission bands of compound 106. The electromagnetic radiation from excitation energy source 516 may be produced by various means, such as but not limited to thermal, electrical, or optical, according to various embodiments. In an embodiment, excitation energy source 516 is configured to modulate the electromagnetic radiation. Such modulation may be electrically or manually induced, depending on, for example, whether the excitation energy source is actively produced, naturally occurring, or a function of re-radiation. Increasing the amount of fluorescing energy that acts upon chemical compound 106, using excitation energy source 516, may increase the emission of radiation from chemical compound 106, which in turn may increase the corresponding volumetric area in which insects' behavior may be affected. The greater the infrared emission from chemical compound 106, the more likely the insect will be able to detect and react to the emission.

In another example of this embodiment, the infrared emission from chemical compound 106 may be increased, for example, by increasing the amount of chemical compound 106 in vessels 101, 201, 301, 401, or 501.

The desired level of emission radiation is a function of the amount of the chemical compound and the amount of energy provided by the excitation energy source, taking into consideration variables such as the cost of the chemical compound, the desired volumetric size of the effective area, and efficiency of the excitation energy source, among other things.

Figure 6:
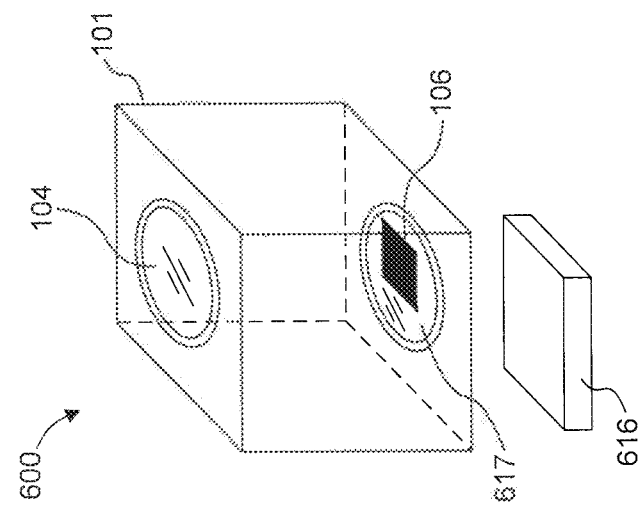
FIG. 6 illustrates an insect decoy system including an external excitation energy source according to an embodiment of the present invention.

According to another embodiment of the present invention, FIG. 6 illustrates an insect decoy system 600. Insect decoy system 600 is similar to insect decoy system 100 of FIG. 1, but includes an additional window 617 in vessel 101 and an excitation energy source 616 located external to vapor-isolated vessel 101. Excitation energy source 616 may be configured to perform similar functions as excitation energy source 516. Window 617 may be transmissive to wavelengths produced by excitation energy source 616. In an embodiment, window 617 may be placed strategically with respect to excitation energy source 616 and chemical compound 106 to allow radiation from excitation energy source 616 to enter vessel 101 and excite chemical compound 106. As discussed above, excitation of chemical compound 106 with excitation energy source 616 may result in chemical compound 106 fluorescing radiation at wavelengths in the infrared spectrum, which are then released through window 104. Insects responsive to or influenced by radiation from chemical compound 106 may be attracted, repelled, or confused depending on the fluorescing wavelength, depending on the intensity of the radiation emitting from compound 106.

In an embodiment, the window allowing radiation from excitation energy source 616 to enter vessel 101 is the same window that allows radiation emitted by the chemical compound to exit vessel 101.

For the sake of simplicity, FIG. 6 illustrates insect decoy system 600 having one substantially flat and straight-sided window 617 that may be transmissive to radiation from an external excitation energy source. However, system 600 may have windows in varying numbers and in varying shapes that are similar to window 617 in their transmissive properties.

Windows 104 and 617 of system 600 may be placed in different orientations with respect to each other and may not necessarily be placed as illustrated in FIG. 6. In an embodiment, vessel 101 of system 600 may have windows transmissive to both wavelengths entering vessel 101 from excitation energy source 616 and leaving vessel 101 from chemical compound 106.

Figure 7:
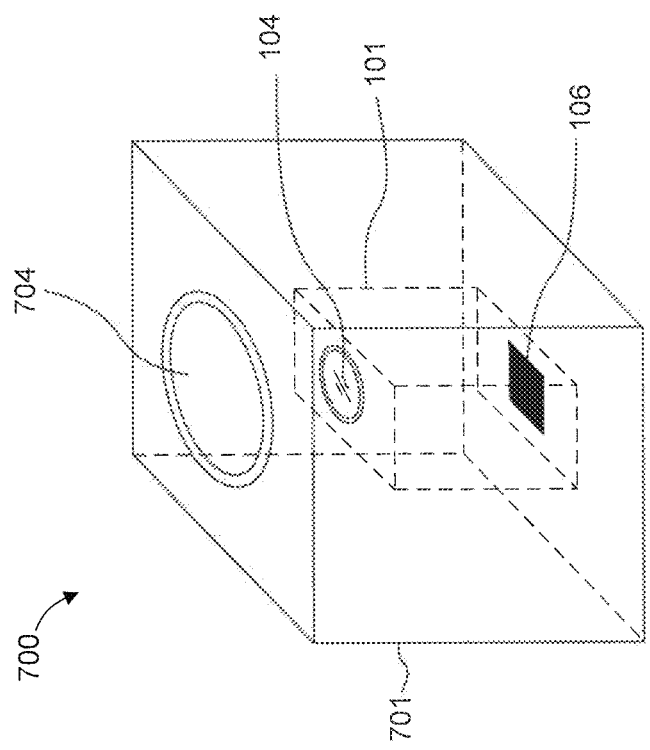
FIG. 7 illustrates an insect trap system according to an embodiment of the present invention.

FIG. 7 illustrates an insect trap system 700 comprising an insect decoy system 100 and an insect trap vessel 701, according to an embodiment of the present invention. Insect trap vessel 701 includes an aperture 704. In an embodiment, insect decoy system 100 may be enclosed within trap vessel 701. System 100 may be strategically positioned in trap vessel 701 such that window 104 and aperture 704 are optically aligned. This optical alignment may enable infrared radiation from chemical compound 106 to exit insect trap system 700 through window 104 and aperture 704 to the surrounding environment. Trap vessel 701 may be configured similarly to vessel 101 as previously discussed. That is, trap vessel 701 may be impermeable to radiation from chemical compound 106. In that case, trap system 700 may not be effective without optical alignment of window 104 and aperture 704. When window 104 and aperture 704 are aligned, the released radiation from chemical compound 106 may attract insects into trap system 700 through aperture 704.

In an example embodiment, aperture 704 is a circular opening on a side of trap vessel 701, as illustrated in FIG. 7. The diameter of aperture 704 may be varied to adjust for insect size and may be designed to allow for insect entry while prohibiting insect escape once inside trap vessel 701, as is common in the art. Although aperture 704 is illustrated as being circular, aperture 704 may form other geometric shapes, or may be located at other positions, such as on sides of trap vessel 701.

In another example of this embodiment, aperture 704 may be attached to a barrier (not shown) that permits insects attracted by the emission from chemical compound 106 to enter aperture 704, but may prevent insects from escaping trap vessel 701. Aperture 704 may be, for example, a one-way bristle-type opening. Multiple apertures similar to aperture 704 may be strategically formed in trap vessel 701. A sticky substance may be disposed inside of trap vessel 701 that may prevent trapped insects from exiting trap vessel 701.

In another embodiment, insect decoy system 100 may be located near, but external to, trap vessel 701.

In yet another embodiment, insect decoy system 100 may be located within a screen mesh forming an enclosed trap that allows the released radiation from chemical compound 106 to pass through the screen, the screen mesh further allowing insects to enter but not escape.

In yet another embodiment, insect decoy system 100 may be located in near proximity to an electrostatic device that stuns or kills the insect.

According to other embodiments of the present invention, insect trap systems may be configured by integrating trap vessel 701 with other insect decoy systems, such as but not limited to systems 500 and 600 as described above. Trap vessel 701 may be configured to enclose systems 500 and 600 in a manner as illustrated for system 100 in FIG. 7.

One example structure, in accordance with an embodiment of the present invention, uses solar radiation-absorptive materials that nocturnally reradiate, serving as an excitation energy source. In one embodiment and by way of example, two intersecting triangles of solar radiation-absorptive materials may be combined to form a tent-like structure. This tent-like structure of re-radiating material constitutes the excitation energy source of the insect decoy system. A vapor-isolated vessel containing the chemical compound of interest is disposed in the interior of the tent-like structure. A vessel wall surrounding the excitation energy source is made from flexible LDPE or HDPE material. The vessel wall is doped with adhesive bands to capture insects attracted to the chamber.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above described exemplary embodiments, but should be defined only in accordance with the following claims and their equivalents.

What is claimed is:

1. An insect decoy, comprising:
   a substantially vapor-isolated vessel having at least one infrared transmissive window;
   a chemical compound disposed within the vessel, the chemical compound having one or more absorption bands at a set of absorption wavelengths and having one or more emission bands at a set of emission wavelengths; and
   an excitation energy source, the excitation energy source configured to produce electromagnetic radiation at the absorption wavelengths so as to fluoresce the chemical compound and release photons at the emission wavelengths,
   wherein the at least one infrared transmissive window is substantially transparent to the released photons at the emission wavelengths.

2. The insect decoy of claim 1, wherein the excitation energy source is disposed within the vessel.

3. The insect decoy of claim 1, wherein the excitation energy source is disposed outside the vessel.

4. The insect decoy of claim 1, wherein the at least one infrared transmissive window is also substantially transparent to the absorption wavelengths.

5. The insect decoy of claim 1, wherein the chemical compound is a pheromone specific to a given type of insect.

6. The insect decoy of claim 1, wherein the vapor-isolated vessel is 100% vapor-isolated.

7. The insect decoy of claim 1, wherein the vapor-isolated vessel is less than 100% vapor-isolated.

8. The insect decoy of claim 1, wherein the vapor-isolated vessel comprises at least one internal reflective surface.

9. The insect decoy of claim 8, wherein the chemical compound is adhered to the at least one internal reflective surface.

10. The insect decoy of claim 8, wherein the at least one internal reflective surface is reflective to electromagnetic radiation at the absorption wavelengths.

11. The insect decoy of claim 8, wherein the at least one internal reflective surface is reflective to electromagnetic radiation at the emission wavelengths.

12. The insect decoy of claim 8, wherein the at least one internal reflective surface is reflective to electromagnetic radiation at both the absorption wavelengths and the emission wavelengths.

13. The insect decoy of claim 1, wherein the excitation energy source comprises an active electromagnetic radiator.

14. The insect decoy of claim 13, wherein the excitation energy source is configured to be modulated.

15. The insect decoy of claim 1, wherein the at least one infrared transmissive window is directional.

16. The insect decoy of claim 1, wherein the at least one infrared transmissive window is omnidirectional.

17. The insect decoy of claim 1, wherein the at least one infrared transmissive window is a lens.

18. The insect decoy of claim 1, wherein electromagnetic radiation at the emission wavelengths attracts a given type of insect.

19. The insect decoy of claim 1, wherein electromagnetic radiation at the emission wavelengths repels a given type of insect.

20. The insect decoy of claim 1, wherein electromagnetic radiation at the emission wavelengths invokes a chaotic response in a given type of insect.

21. The insect decoy of claim 1, further comprising a trap configured to hold one or more insects.

* * * * *